June 29, 1954 M. I. BURGETT, JR 2,682,366

COMPUTER FOR DETERMINING RATIO TIME VARYING SIGNALS

Filed April 11, 1951

INVENTOR.
MONTE I. BURGETT, JR.
BY
Dean V. Hazeltine
ATTORNEY

Patented June 29, 1954

2,682,366

UNITED STATES PATENT OFFICE 2,682,366

COMPUTER FOR DETERMINING RATIO OF TIME VARYING SIGNALS

Monte I. Burgett, Jr., Philadelphia, Pa., assignor to Philco Corporation, Philadelphia, Pa., a corporation of Pennsylvania Application April 11, 1951, Serial No. 220,459

10 Claims. (Cl. 235—61)

Figure 1:
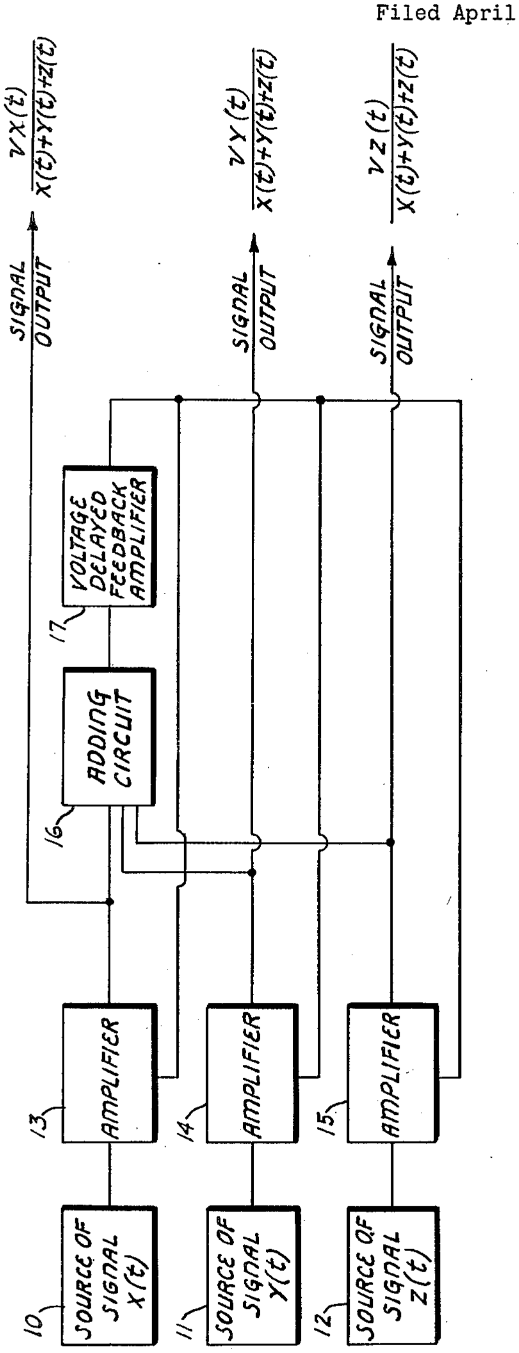

The present invention relates to circuits for modifying the amplitudes of a plurality of time-varying signals in such a manner that their relative amplitudes are preserved while the sum of their absolute amplitudes is held constant.

The need for such circuits arises, for example, in color television systems wherein the scene to be televised is viewed simultaneously by red, green and blue light responsive cameras which produce output signals of amplitudes respectively proportional both to the amount of one particular color relative to the other colors and to the absolute brightness of that same color. It is well known, that any particular color mixture can be defined in terms of the relative amounts of three primary colors, such as red, green and blue, required to produce this mixture, without regard to the brightness of the mixture, which latter may be independently specified. Furthermore, the sum of these amounts of red, green and blue color required to produce any color mixture is always constant. Since a color television system which is compatible with the present-day black and white system requires, in most cases, the transmission of a signal representative of brightness information only which is readily distinguishable and separable from the signal representative of color information, it has appeared desirable to separate the color signal from the brightness signal for entirely separate transmission to distant receivers. It is then in effecting this separation of brightness and color signals that the circuits hereinbefore briefly characterized are utilized.

Thus, such a circuit may be supplied with the output signals of all three cameras, each of these signals being proportional to both color and brightness information. Inasmuch, however, as only the signal components representative of color information add up to a constant value, only these latter will be present at the outputs of my circuit, the brightness contributions having been eliminated.

Note that the applicability of such circuits is by no means confined to color television systems but extends to all fields in which signals which should have a constant sum amplitude are contaminated by extraneous amplitude components.

Accordingly, it is an object of the invention to provide a circuit which is adapted to be supplied with a plurality of time-varying electrical signals and which is operative to produce an output signal proportional to the ratio of one of the supplied signals to the algebraic sum of the supplied signals.

It is another object of the invention to provide a circuit which is adapted to be supplied with a plurality of arbitrarily time-varying signals and which is responsive to produce a plurality of output signals each one of which is proportional to the ratio of a different supplied signal to the sum of all the supplied signals.

It is still another object of the invention to provide a circuit responsive to a plurality of arbitrary input signals to produce a plurality of output signals each of which is proportional to a different input signal and the sum of which is constant.

To the foregoing general ends, I provide first means for producing a signal proportional to the sum of several individual signals and second means supplied with one of these individual signals and with the signal produced by the first means and operative to divide the said one signal by the said sum signal.

Figure 2:
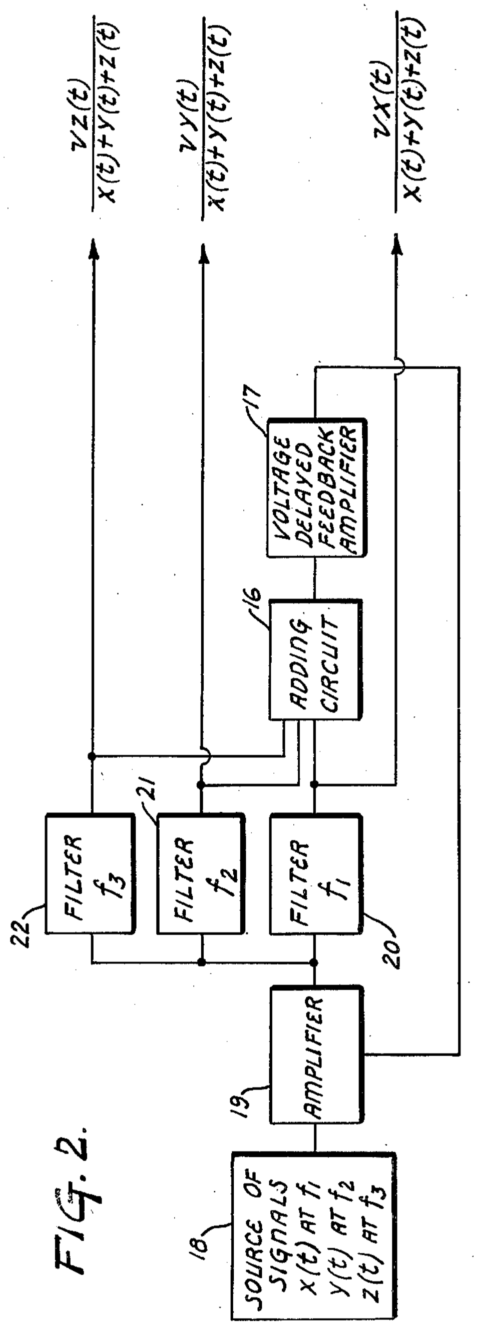

The manner in which these basic components are specifically constructed and arranged in accordance with my invention will be more readily apparent from a consideration of the following detailed description when considered in the light of the accompanying drawings wherein:

Figure 1 illustrates an embodiment of the invention generally useful when the individual signals are of arbitrary form; and Figure 2 shows a simplified embodiment of the invention whose application is practical when the individual applied signals have certain distinguishing relationships.

For purposes of illustration, the embodiment of my invention illustrated in Figure 1, to which more detailed reference may now be had, has been shown as operating on three separate, independently time-varying electrical signals which may be of arbitrary forms $X(t)$, $Y(t)$ and $Z(t)$ and which are derived, respectively, from signal sources 10, 11 and 12. Let it be understood from the outset that my invention is by no means limited to use with three or indeed any other specific number of different input signals. Instead my circuit may be modified, in a manner which will be explained in detail hereinafter, to accommodate any number of input signals for the purposes hereinbefore described. In the present exemplary case, however, signals derived from source 10 are first supplied to amplifier 13, while signals from source 11 are supplied to amplifier 14 and signals from source 12 to amplifier 15. These three amplifiers may be conventional vacuum tube amplifiers and they are preferably selected so that all their amplification characteristics are substantially the same. The output signals produced by these three amplifiers are then jointly supplied to a conventional signal adding circuit 16, which may take the form of a vacuum tube amplifier circuit having a control grid electrode input circuit to which all three signals are applied simultaneously and in the same relative phase relationships with which they are derived from the three amplifiers. In this circuit they are combined to produce a single output signal whose amplitude, at any particular time, is equal to the sum of the amplitudes of the three component signals at the same time. Thus, the signal which is obtained at the output of adding circuit 16 is, in the illustrative case under consideration, proportional to the sum of the original signals derived from sources 10, 11 and 12, or a function of the form of $X(t)+Y(t)+Z(t)$.

The sum signal produced by adding circuit 16 is then supplied to feedback amplifier 17, whose output is, in turn, resupplied to each of amplifiers 13, 14 and 15 to control the gain of each of the latter in such a manner that their outputs are made equal to the ratio of the respective original input signal to the fed-back signal.

To insure faithful reproduction, by each amplifier, of the form of its input signal, it is preferred to effect this gain control in a manner which permits operation of the amplifier tubes on the linear part of their transfer characteristic. This condition is met when the input signal and the fed-back signal are applied to different control grid electrodes of each tube, it being well known that the combined effect of vacuum tube gain control by two signals applied to different control grid electrodes is such as to produce an output which is either the product or the quotient of the applied control signals depending on whether these are applied with the same phase or with opposite phase. In the case at hand, the fed-back signal should be in opposite phase to the input signal, the necessary phase relation being ordinarily provided by the feedback amplifier proper, although auxiliary phasing means may be provided, if necessary.

Alternatively, the fed-back signal may be applied to each amplifier tube at the same control grid as the input signal. However, this procedure necessitates operating the amplifier on a non-linear portion of its characteristic.

For proper system operation, feedback amplifier 17 should have a gain which is substantially higher than that of any one of amplifiers 13, 14 and 15. The reason for this will be apparent to those familiar with the characteristics of feedback circuits, being found in the fact that the controlled signal approaches its desired controlled level more closely as the gain of the feedback circuit is increased. Thus, the output signal of each of amplifiers 13, 14 and 15 may be brought arbitrarily close to the desired value of input-to-fed-back signal ratio by simply increasing the gain of feedback amplifier 17. In practice, a gain of 100 will often give a sufficiently nearly correct output signal.

With such a high gain feedback amplifier, the output signals from amplifiers 13, 14 and 15 would, in the absence of further precautions, soon be reduced to very minute absolute values which would require much subsequent amplification before being ready for practical utilization. To avoid this difficulty, a delay potential of some arbitrary value V is introduced into the feedback amplifier 17, this being a potential which is utilized within the amplifier in such a way as to render the latter unresponsive to all signals whose value is below that of this potential V. At the same time, amplifiers 13, 14 and 15 are so arranged that, in the absence of any gain reducing feedback, they can always raise the sum of their output signals, as produced by adding circuit 16, to a value greater than V. The high gain feedback circuit hereinbefore specified will then operate to maintain the sum output signal of adding circuit 16 substantially at this value V irrespective of the fluctations in either relative or absolute amplitudes of its component signals. The individual output signals of amplifiers 13, 14 and 15 will then be fractions of this value V in the same proportions as the absolute amplitudes of the corresponding input signals initially applied to these amplifiers.

An additional precaution which should be observed in the preferred embodiment of my invention is to keep the time delays in the feedback path at a minimum for, if these time delays become excessive, then the amplifier gain will no longer be controlled by the feedback signal with sufficient rapidity and the operation of the entire circuit will be upset.

Thus, the three ouput signals of amplifiers 13, 14 and 15 will not only be in the proper ratios individually but will also produce a constant sum signal irrespective of variations in the relative or absolute amplitude of the individual original signals.

It is emphasized that the specific number of original input signals handled by the circuit illustrated in Figure 1 is purely exemplary and that any arbitrary number of such input signals may be operated on in the same manner by the provision of a corresponding number of amplifiers of the type represented by amplifiers 13, 14 and 15, as well as by suitable modification of adding circuit 16 so as to accommodate any particular number of component signals. Needless to say, the output of feedback amplifier 17 must be supplied to each such amplifier in the manner hereinbefore described, irrespective of the number of such amplifiers which is required to take care of a particular number of input signals.

Since amplifiers are expensive devices and since it is sometimes difficult to select numerous amplifiers so as to have the substantially identical amplification characteristics required by the generalized embodiment of Figure 1, it is preferred to use a single amplifier in their place whenever the character of the input signal permits. A case in which this is practical is illustrated in the embodiment of Figure 2 to which more detailed reference may now be had. In this embodiment there is seen a common source 18 of three separate input signals of the form $X(t)$, $Y(t)$ and $Z(t)$, respectively. While each of the individual signals may vary with time in its own arbitrary manner independently of any of the others, in the special case under consideration, they are characterized principally by being at three substantially different frequencies $f_1$, $f_2$ and $f_3$. These three input signals are now applied to an amplifier 19 which is fundamentally similar to any one of amplifiers 13, 14 or 15 of Figure 1 and which, of course, has a passband sufficiently wide to transmit signals of all three input frequencies with substantially the same amplification characteristics. The output of amplifier 19 is connected to three filters, respectively designated 20, 21 and 22. Of these, filter 20 is transmissive of signals of frequency $f_1$ to the substantial exclusion of all others, while filter 21 transmits signals of frequency $f_2$ alone and filter 22 similarly transmits only signals of frequency $f_3$. Thus, at the output of the filters there appear the respective input signal components X(t), Y(t) and Z(t), as modified in amplitude by traversal of amplifier 19. The instantaneous amplitude values of these three separated signals are now additively combined in an adding circuit which is substantially identical with adding circuit 16 of Figure 1 and which has, therefore, been identified with the same reference numeral. The combined signal output produced by this adding circuit is then supplied to a voltage delayed feedback amplifier 17 identical with the similarly numbered component of Figure 1 and the output of this feedback amplifier is, in turn, reapplied to amplifier 19 where it serves to modify the gain of the amplifier equally for all three signals applied thereto in such a manner as to produce an output signal which equals the ratio of the input signal to the fed-back signal. It is seen that, in the present case, the various input signals are readily distinguishable from each other by some unrelated characteristic such as frequency, so that a single amplifier may be used to effect their division by their sum, thereby avoiding the necessity of careful matching of several amplifiers. Note, that in the present case these signals must be separated so as to be suited for additive combination in adding circuit 16. However, this may be accomplished by conventional filters such as 20, 21 and 22 whose passive components are considerably easier to match than are amplifiers that include active elements such as vacuum tubes. In consequence of the operation of the circuit hereinbefore described, there will now appear at the output of filter 20, a signal which is proportional to the instantaneous amplitude of the input component X(t) divided by the sum of the input components X(t), Y(t) and Z(t). Similarly, at the outputs of filters 21 and 22, there will appear, respectively, signals proportional to the ratio of the input component Y(t) and Z(t) to the sum of all three input components.

Here again, no restrictive significance is to be attached to the particular number of input signal components selected for purposes of illustration. On the contrary, similar arrangements can be devised for any desired number of input components by simply providing the proper number of filters for their separation.

Since other arrangements will occur to those skilled in the art without departing from my invention, I desire the latter to be limited only by the appended claims.

I claim:

1. A source of a first signal of time-varying amplitude; a source of a second signal of time-varying amplitude; first means responsive to signals applied thereto to produce a third signal of amplitude proportional to the sum of the amplitudes of the applied signals; second means for applying said first and second signals to said first means; and third means supplied with said first and third signals and operative to produce a signal of amplitude proportional to the ratio of said first signal to said third signal.

2. A source of a first signal of time-varying amplitude; a source of a second signal of time-varying amplitude; first means responsive to applied signals to produce a third signal of amplitude proportional to the sum of the amplitudes of the applied signals; second means for applying said first and second signals to said first means; third means supplied with said first and third signals and operative to produce a signal of amplitude proportional to the ratio of said first signal to said third signal; and fourth means supplied with said second and third signals and operative to produce a signal of amplitude proportional to the ratio of said second signal to said third signal.

3. A source of a first signal of time-varying amplitude; a source of a second signal of time-varying amplitude; first means responsive to applied signals to produce a third signal whose amplitude is proportional to the sum of the amplitudes of the applied signals; second means for applying said first and said second signal to said first means; amplifying means supplied with said third signal and operative to produce a fourth signal of the form of said third signal and of substantially increased amplitude; and means supplied with said first and fourth signals and operative to produce an output signal proportional to the ratio of said first signal to said fourth signal.

4. In combination: a signal transducer having a pair of input circuits, said transducer being arranged to produce an output signal which is proportional to a signal applied to one of said input circuits and which is also proportional to the ratio of said applied signal to a signal applied to the other of said input circuits with opposite phase; a source of a first signal; a source of a second signal; means for applying said first signal to said one transducer input circuit; signal adding means responsive to supplied signals to produce a third signal whose amplitude is proportional to the sum of the amplitudes of the supplied signals; means for supplying the output of said transducer and said second signal to said adding means; and means for applying said third signal to said other transducer input circuit with opposite phase to said first signal.

5. A source of a first signal of time-varying amplitude; a source of a second signal of time-varying amplitude; first means responsive to supplied signals to produce a third signal of amplitude proportional to the sum of said supplied signals; second means for supplying said first and said second signals to said first means; third means supplied with said first and third signals with opposite phase and responsive to signals of opposite phase to produce a fourth signal of amplitude proportional to the ratio of one of said supplied signals to the other.

6. A source of a first signal of time-varying amplitude; a source of a second signal of time-varying amplitude; first means responsive to signals supplied thereto to produce a third signal of amplitude proportional to the sum of the amplitudes of the supplied signals; second means for supplying both said first and second signals to said first means; third means supplied with said third signal and operative to transmit portions of said third signal which are in excess of a predetermined amplitude level; and fourth means supplied with said first signal and the transmitted portions of said third signal and operative to produce a signal of amplitude proportional to the ratio of said first signal to said transmitted portions of said third signal.

7. In combination: an amplifier having controllable gain, said amplifier being adapted to be supplied with a first signal of time-varying amplitude; first means connected to the output of said amplifier and adapted to be supplied with a second signal of time-varying amplitude, said means being responsive to signals supplied thereto to produce a third signal of amplitude proportional to the sum of the amplitudes of the supplied signals; second means supplied with said third signal and operative to apply said third signal to said amplifier to control the gain thereof.

8. A source of a first signal of time-varying amplitude; a source of a second signal of time-varying amplitude; an amplifier having controllabe gain; means for supplying said first signal to said amplifier with predetermined phase; adding means responsive to signals supplied thereto to produce a third signal of amplitude proportional to the sum of the amplitudes of the supplied signals; connecting means for supplying the output of said amplifier and said second signal to said adding means; and means for supplying said third signal with opposite phase to said amplifier to control the gain thereof.

9. A source of first and second signals in different frequency bands; an amplifier adapted to pass signals in both said bands with substantially equal controllable gain; means for supplying both said signals to said amplifier; a pair of separate channels; means for directing said first signal after passage through said amplifier into one of said channels; means for directing said second signal after passage through said amplifier into the other of said channels; adding means responsive to signals applied thereto to produce a third signal of amplitude proportional to the sum of the supplied signals; means for supplying the signals to both said separate channels to said adding means; and means for utilizing said third signal to control the gain of said amplifier.

10. Apparatus according to claim 8 characterized in that said means for supplying said third signal with opposite phase to said amplifier includes an amplitude sensitive amplifier constructed to transmit only signals whose amplitude exceeds a predetermined value.

References Cited in the file of this patent

UNITED STATES PATENTS

| Number | Name | Date |
|---|---|---|
| 2,401,779 | Swartzel, Jr. | June 11, 1946 |
| 2,455,974 | Brown | Dec. 14, 1948 |
| 2,515,888 | Murray | July 18, 1950 |
| 2,567,532 | Stephenson | Sept. 11, 1951 |
| 2,595,185 | Zauderer et al. | Apr. 29, 1952 |

OTHER REFERENCES

Analysis of Problems in Dynamics by Electronic Circuits; J. R. Ragazzini et al.; "Proceedings of the Institute of Radio Engineers"; Volume 35, No. 5; May 1947; pages 444–452.

Electrical Analogue Computing—Part I; D. J. Mynall; "Electronic Engineering"; June 1947; Pages 178–180.